March 25, 1952 G. M. MAST ET AL 2,590,260
STEREOSCOPIC FILM VIEWER
Filed Aug. 24, 1948 2 SHEETS—SHEET 2
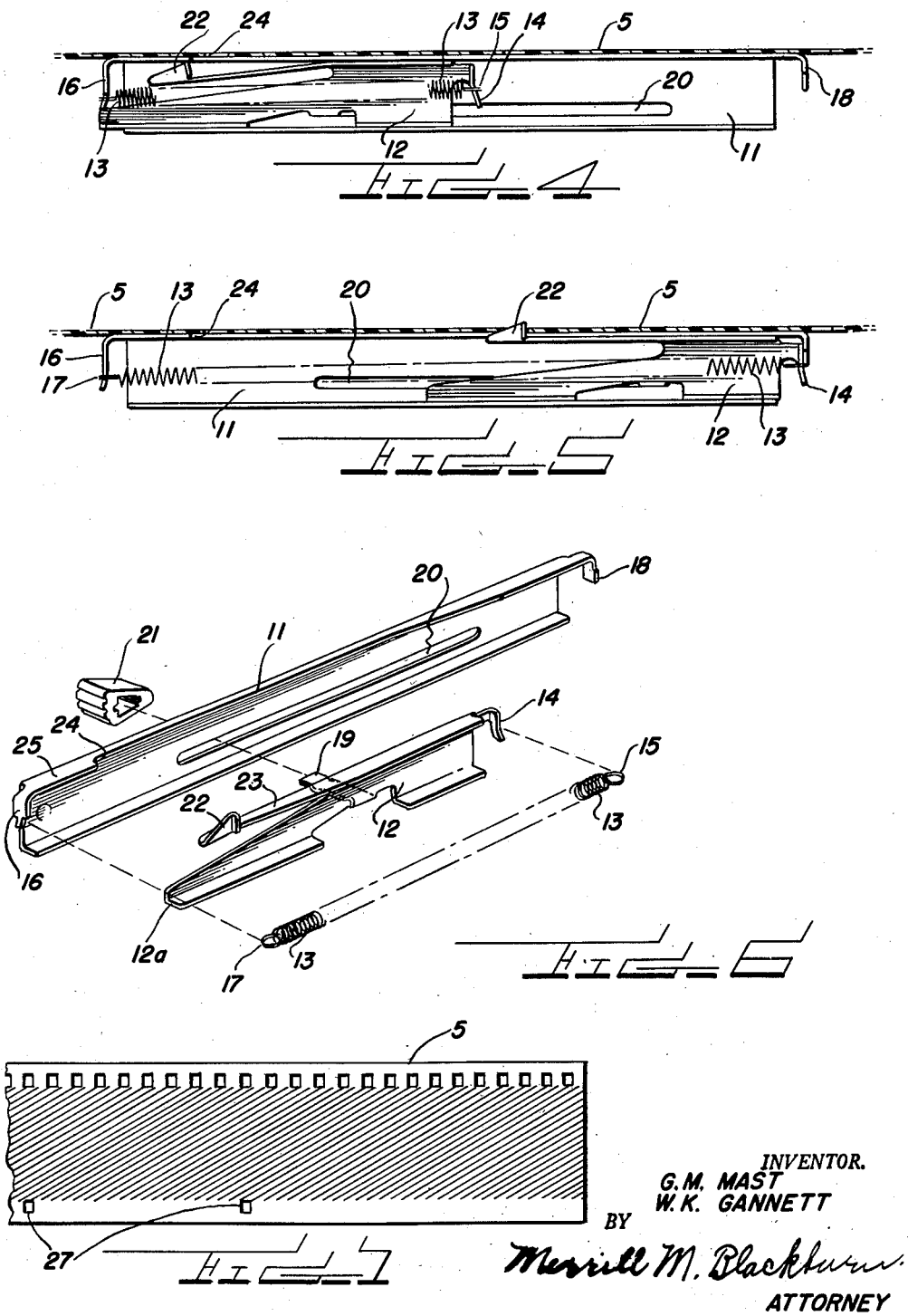
INVENTOR.
G. M. MAST
W. K. GANNETT
BY
Merrill M. Blackburn
ATTORNEY Patented Mar. 25, 1952

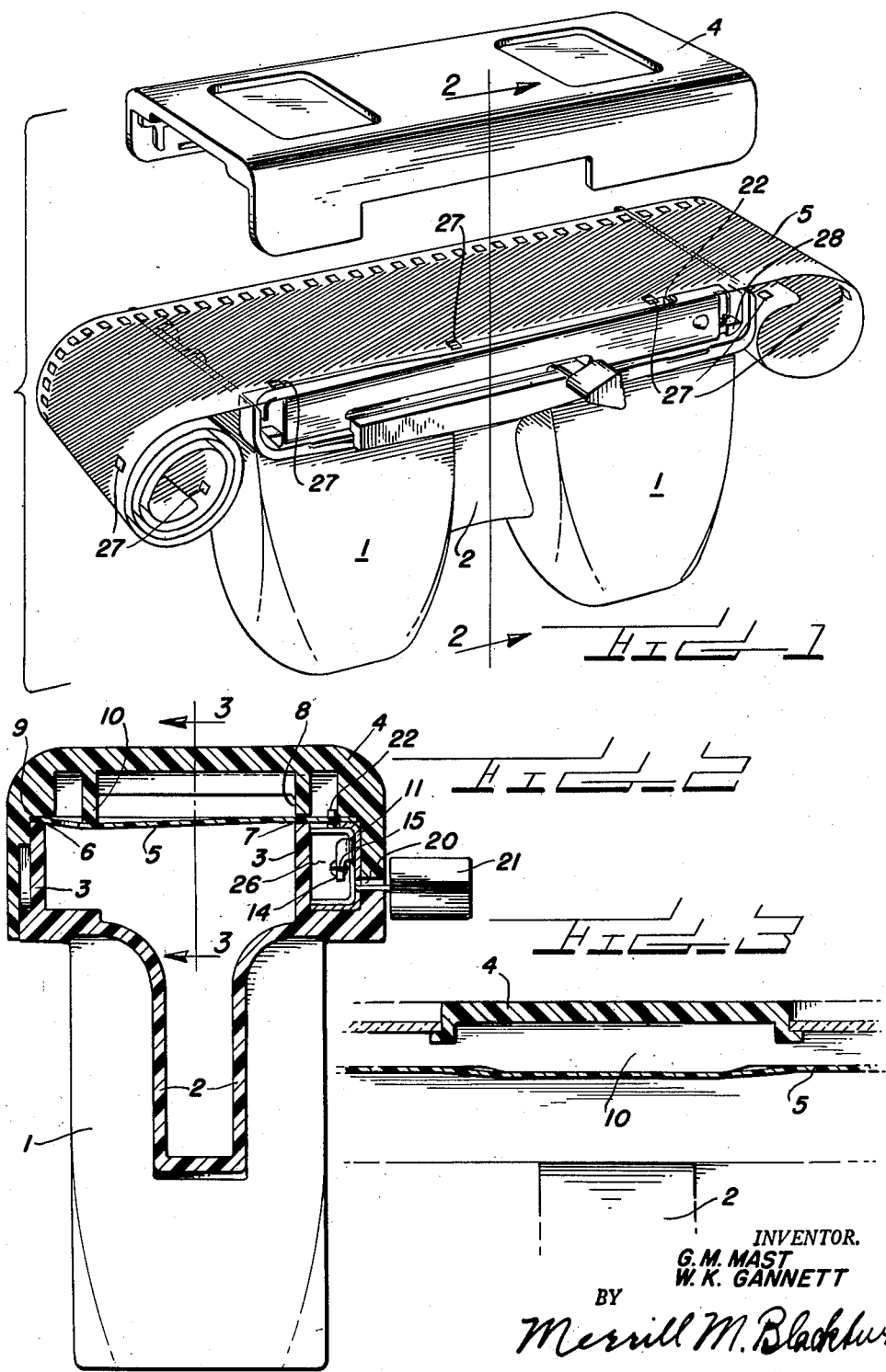

2,590,260

UNITED STATES PATENT OFFICE 2,590,260

STEREOSCOPIC FILM VIEWER

Gifford M. Mast and Wright K. Gannett, Davenport, Iowa, assignors to Tru-Vue Company, Beaverton, Oreg., a copartnership Application August 24, 1948, Serial No. 46,832

3 Claims. (Cl. 88—31)

1

The present invention relates to improvements in the structure disclosed in Patent No. 2,326,718 and among the objects of this invention are the provision of an improved form of film actuator which can be assembled outside of the body of the viewer and then installed therein as a unit, whereby to simplify the construction and reduce the cost of production of the viewer; the provision of a modified form of film which will obviate what has heretofore at times happened, namely, the film has been fed entirely through the machine without the operator being aware of having reached the end of the film; the provision of improved means for insuring that the film will be held substantially flat when passing through the viewer; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Fig. 1 represents an expanded perspective view of a structure embodying our present invention;

Fig. 2 represents a vertical transverse section substantially along the plane indicated by the line 2—2, Fig. 1;

Fig. 3 represents a fragmentary longitudinal section of a structure embodying our present invention, taken substantially along the plane indicated by the line 3—3, Fig. 2;

Fig. 4 represents a side elevation of the film-actuator mechanism, with the film shown in section;

Fig. 5 is a view similar to Fig. 4 but with the film-actuating device moved to the opposite end and substantially at the end of its film-actuating movement;

Fig. 6 represents an exploded view of the film-actuating device, in perspective; and Fig. 7 is a plan view of an end portion of a film showing the arrangement of the actuating perforations.

This construction comprises a pair of picture-viewing tubes 1 connected by a bracing member 2 and to a body 3. To this is connected a cover member 4 which snaps in place and presses on the outer face of the film 5 to hold the same substantially flat in the area carrying the pictures to be viewed. The edges 6 and 7 of the top and bottom walls of the viewer are straight and parallel and furnish a support for the film 5 as it passes through the viewer.

A rib 8 on the inside of the cover 4 has a straight edge which is spaced slightly from the edge 7 and provides enough room for the film 5 to slide freely between the two. The edge 6 of the opposite wall of the body 3 is straight and therefore tends to hold the film straight when the edge 9 of the cover 4 is pressed against it. The edge 9 on the inside of the cover 4 is straight and spaced slightly from the edge 6 to provide a space in which the edge of the film 5 may slide. A rib 10 is formed on the inner face of the cover 4 and, in its central part, this rib extends backwardly a few thousandths of an inch to be sure to take out the natural buckle in the film and make it substantially flat in the areas to be viewed.

In order to feed the film 5 through the viewer, use is made of the film-actuator mechanism shown in Figs. 4, 5, and 6 which comprises a channel member 11, a slide 12, and an actuating spring 13. Both members 11 and 12 are of channel form and the slide 12 has at one end a hook or post 14 to which the eye 15 of spring 13 is connected. The channel member 11 is provided at one end with a hook 16 to which the eye 17 of spring 13 is connected, the second end of channel member 11 being provided with an abutment 18 which serves as a limiting stop for movement of the slide 12. The hook or post 14, abutting against the stop 18, limits the motion of the slide 12 in one direction while the engagement of the end 12a of the slide 12 limits the motion of this slide in the opposite direction.

An arm 19 extends laterally from the slide 12 and out through a slot 20 in the closed side of the channel member 11. On this arm 19 is mounted a finger piece 21 which is used in actuating the slide 12, of which the hook 22 forms a part. This hook is carried by a spring arm 23 which normally slides in a recess 24 formed at one edge of the channel member 11. However, the hook 22, as the slide approaches one end of its travel under the influence of the spring 13, rides under the wall 25 of the channel member and is released from its engagement with the edge of film 5. This releases the film 5 and insures proper positioning of the film so that the perforation 27 therein will be in position to be engaged by the hook 22 when actuated. When the handle 21 is moved in the opposite direction, the hook 22 comes out from under the wall 25 and engages in the first available notch or perforation 27 in the edge of the film. Attention is directed to the ease with which the actuator-mechanism, shown in Figs. 4, 5, and 6, can be assembled, since it is assembled as a unit independently of the body of the viewer and installed as a unit in the cavity 26 in the side wall of the housing 3. In order to prevent actuation of the film beyond the final viewing position, we omit the final perforation 27 at one end portion of the film, as indicated in Fig. 7. There is, therefore, no opening at this point to be engaged by the hook 22 and, therefore, no reason for the film to be actuated farther.

It has been found that, when roll film is unrolled, there is a tendency for it to curl transversely, with the concave side inwardly. In order to overcome this tendency, we have placed the ribs 8 and 10 on the cover 4, and the rib 10, with its supporting wall 3, tends to keep the film flat. Also, as seen in Fig. 3, there is a slight hump on the central portion of the rib 10 which tends to furnish a braking effect on the film and to keep it from sliding in a reverse direction, with the feeding hook 22, when this is returned by the spring 13. To a certain extent, there is also a braking effect produced by the pressure of the walls 3, 8, and 10, even without the hump on the rib 10.

It will of course be understood that the specific description of structure set forth above may be departed from without departing from the spirit of this invention as disclosed in this specification and as defined in the appended claims.

Having now described our invention, we claim:

1. A stereoscopic film-viewer, comprising a pair of parallel, spaced-apart viewing tubes, an elongated body and cover for supporting and guiding film to be viewed, said tubes being secured to said body at adjacent ends of said tubes and adjacent to the ends of said body, said cover extending over said body on the side thereof away from said tubes whereby to form a film passage between said cover and body perpendicular to the plane of the axes of the tubes, said body having an elongated recess parallel to said passage and opening toward an edge of a film in said passage, a film-advancing assembly freely received and positioned in said recess, said assembly comprising a channel of a size to fit said recess, a slide positioned within said channel slidable longitudinally thereof, a spring attached to said slide and channel for biasing said slide toward one end of said channel and for allowing manual movement of said slide in the opposite direction, a film-advancing lug carried by said slide, and a spring actuated normally to bias said lug toward a film in said passage for engagement in openings along an edge of said film, said slide having an arm movable therewith extending outwardly from said recess for manual actuation of said slide.

2. A film-viewer in accordance with claim 1 in which said channel includes a shoulder for engagement with said lug in the position of said slide to which it is spring-biased, said lug having an inclined surface for engagement with said shoulder, whereby, upon termination of movement of said slide under spring-actuation thereof, said lug is withdrawn from film-engaging position.

3. A stereoscopic film-viewer, comprising a pair of parallel, spaced-apart viewing tubes, an elongated body and cover for supporting and guiding film to be viewed, said tubes being secured to said body at adjacent ends of said tubes and adjacent to the ends of said body, said cover extending over said body on the side thereof away from said tubes whereby to form a film passage between said cover and body perpendicular to the plane of the axes of the tubes, said body having an elongated recess parallel to said passage and opening toward an edge of a film in said passage, a film-advancing assembly freely received and positioned in said recess, said assembly comprising a channel of a size to fit said recess, a slide positioned within said channel slidable longitudinally thereof, a spring attached to said slide and channel for biasing said slide toward one end of said channel and for allowing manual movement of said slide in the opposite direction, a film-advancing lug carried by said slide, said lug being adapted to engage slots in said film and said slots to advance said film in said film passage, and a spring actuated normally to bias said lug toward a film in said passage for engagement in openings along an edge of said film, said slide having an arm movable therewith outwardly from said recess for manual actuation of said slide.

GIFFORD M. MAST.
WRIGHT K. GANNETT.

REFERENCES CITED

The following references are of record in the file of this patent:

UNITED STATES PATENTS

| Number | Name | Date |
|---|---|---|
| 1,065,133 | Ivatts | June 17, 1913 |
| 1,499,941 | Marette | July 1, 1924 |
| 1,796,432 | Barlatier | Mar. 17, 1931 |
| 1,862,364 | Heisler | June 7, 1932 |
| 1,957,904 | Ord | May 8, 1934 |
| 2,003,480 | De Vry | June 4, 1935 |
| 2,122,649 | Kahn | July 5, 1938 |
| 2,326,718 | Mast | Apr. 10, 1943 |

FOREIGN PATENTS

| Number | Country | Date |
|---|---|---|
| 417,364 | Great Britain | Oct. 3, 1934 |
| 525,110 | Great Britain | Aug. 21, 1940 |